July 4, 1961
P. J. NATHO
2,991,042
FAIL-SAFE THROUGH-CONDUIT GATE VALVE
Filed July 19, 1957
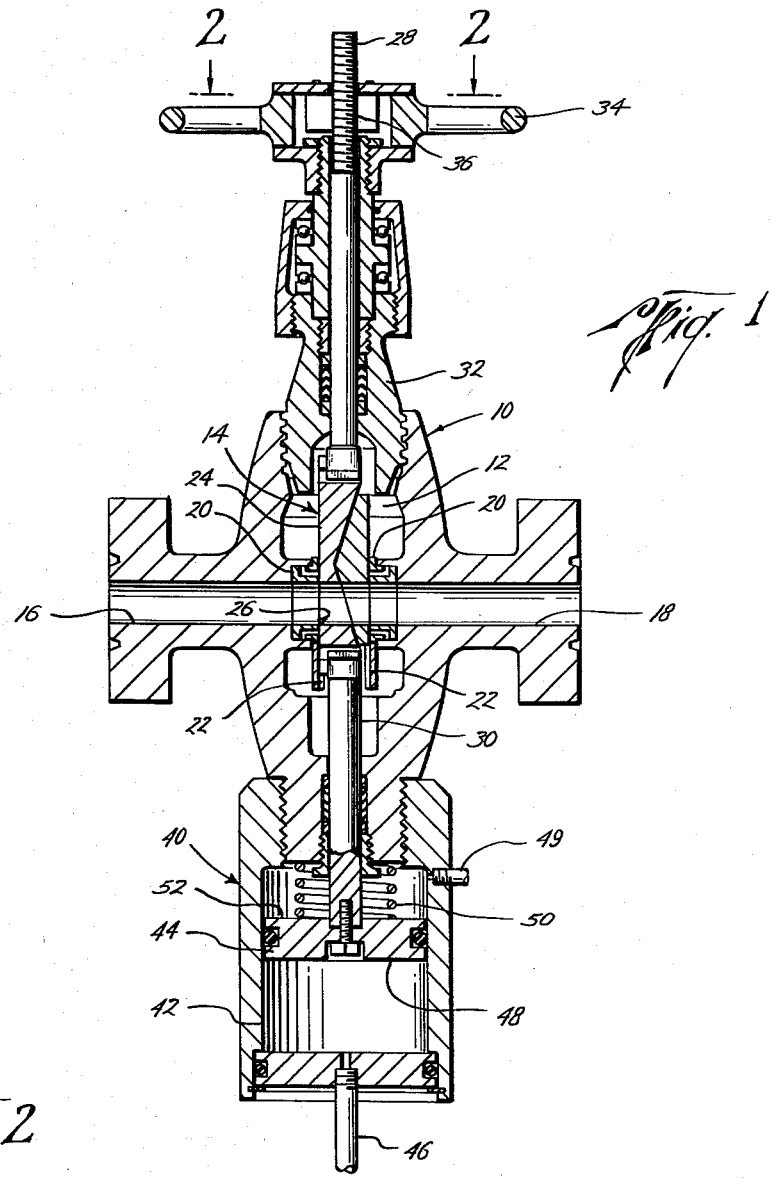
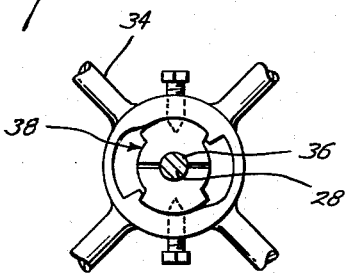
Paul J. Natho
INVENTOR.
BY Russell E. Schloff
ATTORNEY

United States Patent Office 2,991,042
Patented July 4, 1961

2,991,042
FAIL-SAFE THROUGH-CONDUIT GATE VALVE
Paul J. Natho, Houston, Tex., assignor to ACF Industries, Incorporated, New York, N.Y., a corporation of New Jersey
Filed July 19, 1957, Ser. No. 673,028
7 Claims. (Cl. 251—14)

This invention relates to "through-conduit" gate valves having an operator incorporated therewith.

Through-conduit gate valves are of the type which, when fully open, have a conduit which is entirely unobstructed. Such valves are used extensively in oil field production as master and flow valves on Christmas trees and as control valves in various pipelines. With the advent of automation in the petroleum industry, it has become desirable to provide such valves with means permitting remote control of the valve from a centralized point. This is particularly important for offshore and other distant installations where the wellhead or pipeline may be located many miles from the base of operations. Such remotely controlled installations are always subject to the hazard that the source supplying power to the operator of the valve may fail; therefore, it is desirable to incorporate a fail-safe feature in the system. A fail-safe feature is a means which, on failure of the power source, automatically moves the valve to a predetermined position, usually closed.

One of the common types of gate valve operators is a hydraulic cylinder. A piston with the cylinder attaches to the operating stem of the valve, and the gate is positioned by pressurizing the cylinder. Inasmuch as one side of the gate has the operating stem attached thereto, the area of such side is reduced, and the gate is in effect unbalanced. Therefore, if there is pressure in the valve body and no pressure in the operator, body pressure acting on the gate will cause the gate to move toward the end having the stem. Accordingly, if pressure to the operator should fail, the gate will automatically remain or move in the direction of the unbalance. Such construction accomplishes the fail-safe function. However, with such a construction, the amount of unbalance is fixed since the size of the operating stem is governed by standard engineering requirements. When the valve is operating at rated pressure, the unbalanced force created by the area of the stem is considerably in excess of the force required to close the valve. Consequently, to open the valve it is necessary to apply excessive external force. On the other hand, should the valve be operated at low pressure, insufficient force would be available to overcome frictional resistance.

Moreover, if it is desired to incorporate manual operating means for the valve, such means must be external to operating cylinder and consequently will increase the overall height of the valve.

In the valve proposed by the present invention, the above objections have been overcome. A standard gate mechanism is provided with dual stems, one extending from each end of the gate mechanism. Manual operating means is attached to the stem on the solid end of the gate and a hydraulic operator is attached to the stem extending from the ported end. The two stems are of different diameters and, therefore, the gate is unbalanced. If it is desired that the valve fail close, the stem attached to the hydraulic operator is of the larger diameter and, therefore, the gate mechanism, being unbalanced, will move in such direction should the power in the operator fail. By having two stems, the choice of unbalanced force can be regulated by selecting the proper ratio between the two stems. The ratio should be such that the unbalanced force obtained at rated pressure approximates the necessary force to overcome frictional resistance to close the valve. By eliminating the excessive unbalance, the amount of force necessary to open the valve is substantially reduced. This feature is especially important if power must be obtained from an outside source. Also, with the manual operating means at one end and the hydraulic operator at the other end, the effective height of the valve is materially reduced.

The present invention has as its primary object the improvement of a piston operated gate valve provided with a fail-safe feature.

It is an important object to provide an automatic fail-close gate valve which is also adaptable to manual operation.

Another object is to provide a fail-close gate valve having a piston operator at one end and disengageable manual operating means at the other.

A further object is to provide manual means for locking a piston operator valve in either open or closed position, thereby preventing its operation by remote means.

A still further object is to provide a fail-safe piston operating valve having dual stems.

A more specific object is to provide a fail-close gate valve utilizing as the automatic closing means the force obtained by the unbalance of a pair of stems extending from opposite ends of the gate mechanism.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for the purpose of illustration and description and is shown in the accompanying drawings forming a part of the specification wherein:

FIG. 1 is a vertical section view of a gate valve embodying this invention. The valve being shown in the open position.

FIG. 2 is a section taken generally on line 2—2 of FIG. 1 showing the split nut arrangement for the manual operating means.

Referring to the drawings, the invention is shown applied to a through-conduit gate valve of the wedging seal type, such as that disclosed in United States Letters Patent to M. P. Laurent, Reissue No. 20,101, dated September 8, 1936. Obviously, the invention can be applied to other types of through-conduit gate valves. The valve has a housing 10 provided with an interior chamber 12 in which is housed the gate mechanism 14. Aligned ports 16 and 18 formed in opposite walls of the housing are provided with parallel, preferably removable, valve seats 20—20. These seats may have lateral side flanges 22, which together with the seats serve to guide and confine the gate mechanism 14 to substantially rectilinear movement.

In the through-conduit type valve the gate mechanism has a solid section 24 which blocks the flow through the valve in the closed position and a flow section which is provided with a conduit 26 which aligns with the ports 16—18 in the open position.

In a manner similar to that disclosed in United States Letters Patent to M. P. Laurent, No. 2,161,175, dated June 6, 1939 there are two stems 28 and 30 attached to the gate mechanism 14, one stem extending from each end thereof. However, unlike the balanced stem construction described in the aforesaid Patent No. 2,161,175, the two stems 28 and 30 are of different diameters for the purpose hereinafter explained.

The stem 28 extends through a bonnet closure 32, which is similar to that disclosed in United States patent issued to M. P. Laurent, No. 2,687,229, dated August 24, 1954. Naturally, any other of the well known bonnet constructions may be utilized. The stem 28 is of the rising stem type having the lower end fastened against independent rotation to the gate mechanism 14 and the upper end threaded. A handwheel 34 having an internally threaded disengageable collar 36 is threadedly engaged with the upper portion of the stem 28. Thus, it will be seen that by turning the handwheel 34, the collar 36 is rotated and the stem 28 is raised or lowered due to the screw jack action of the interengaged threads. In order that the gate mechanism 14 can be moved independently of any rotation of the handwheel 34, the collar 36 is provided with a split nut arrangement 38. The split nut arrangement is shown engaged in FIG. 2. The threaded collar is usually retained in a disengaged condition and is only engaged when manual operation or locking against remote operation is desired.

A hydraulic cylinder 40 is attached to the end of housing opposite the handwheel 34. The hydraulic cylinder 40 is provided with a chamber 42 in which there is a piston 44. The piston 44 is attached to the gate mechanism 14 by the stem 30; therefore, as the piston 44 moves within the chamber 42, the gate mechanism 14 moves correspondingly to open or close the valve. In the fail-close valve illustrated, the stem 30 is of a larger diameter than the stem 28; therefore, if there is pressure in the valve and no pressure in the operator, the body pressure, due to the unbalance of the gate, as will be herein more fully described, will move the gate 14 toward the operator pushing the piston 44 to the outer end.

A passage 46 in the end of the cylinder 40 is provided to permit application of pressure to the piston 44. Since the gate 14 will always move the piston 44 toward the outer end of the operator, there should be no pressure holding the piston 44, and it is only necessary to pressurize the outer side 48 of the piston. The inner end of the cylinder may be provided with a vent 49 to maintain atmospheric pressure. In order that the valve will close, even though there is not sufficient pressure in the body to overcome the frictional resistance of the gate mechanism 14 against the seats 20 and the piston 44 against the wall of the chamber 42, a spring 50 may be provided. The spring 50 is of sufficient magnitude to overcome any frictional resistance and close the valve without any assistance from pressure in the valve body. The spring 50 is desirable since it is conceivable that a downstream rupture may occur adjacent to the downstream side of the valve body whereby the valve body would not contain sufficient pressure to close the gate even though all pressure was relieved from the operating cylinder.

As previously mentioned, the two stems 28 and 30 are of different diameters; therefore, the top and bottom of the gate mechanism 14 expose substantially different areas within the chamber 12 to body pressure. Since the pressure throughout the body is equal, the resultant force of such pressure will be greater on the larger area. Therefore, if there is no external force restraining movement of the gate, the gate mechanism 14 being unbalanced will move in the direction of the unbalance, which is the end having the stem of the larger diameter. Therefore, if for any reasin, the pressure applied to the piston 44, creating the external force, should fail, the valve will automatically close by virtue of the resulting unbalanced force. By having the two different diameter stems 28 and 30, the ratio of unbalance between the stems can be regulated so that the unbalanced force resulting from the differential area approximates the forces necessary to close the valve. This is not possible with a single stem construction, since the prescribed size of stem results in a force far in excess of the amount necssary to close the valve. Accordingly, with a single stem, this excess force must be overcome to open the valve, and if an external source of power is utilized, additional horsepower is required. This is exceedingly important if this power must be transmitted over long distances. The addition of a spring to a single stem operator merely adds to the force required to open the valve, whereas the addition of a spring to the dual stem construction herein disclosed supplements the closing force without making the opening force excessive.

In order to operate the valve, fluid under pressure enters the cylinder 40 through the passage 46 and exerts a force upon the face 48 of the piston moving it toward the valve housing. As the piston 44 moves, the gate mechanism 14 moves correspondingly and uncovers the ports permitting flow through the valve. The valve remains open until pressure on the side 48 of the piston 44 is removed. When the pressure on the piston 44 is released, assuming there is pressure in the body, the pressure in the body will close the valve. If, however, there is no pressure in the valve, the spring 50 will exert pressure on the piston 44 forcing it away from the valve, accordingly moving the gate 14 into the closed position. Therefore, if at any time the source of power supplying fluid to the operator fails, the valve will automatically close regardless of whether the body is pressurized or not, without any further action.

If it should be desired that the valve always fail in an open position, the stem attached to the piston operator should be of the smaller diameter. Also, the side 52 of the piston 44 should be the pressure side and the source of operating fluid attached to the passage 49, in which case the passage 46 becomes a vent maintaining atmospheric pressure. Also, the spring 50 should be on the side 48 of the piston.

If it is desired to open the valve after the source of fluid power has failed and the valve has been closed by the fail-safe feature, the manual operating means may be engaged and the handwheel 34 rotated to open the valve. By leaving the manual operating means engaged, the valve will remain open. After the supply of power to the operator has been restored, the manual operating means should be disengaged, allowing the stem 28 to be moved independent of rotation of the handwheel. If manual operating means have not been attached to the stem 28, the valve can be opened by attaching a hand pump, or suitable means, to the passage 46, thereby supplying pressure to the piston 44.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

I claim:

1. In a valve construction, a housing forming a valve chamber having aligned ports provided with opposed valve seats; gate mechanism having a solid portion to cover said ports in closed position and a flow section having a conduit for aligning with the ports in open position mounted in said chamber for rectilinear movement between said seats to open and close the valve; two stems of different diameters, the smaller stem extending from the end of the solid portion of the gate mechanism and the larger stem extending from the flow portion of the gate mechanism, the stem extending from the conduit end attached to a hydraulic piston operator, the ratio between the stems being such that the unbalanced force resulting from the differential cross-sectional areas of the stem at rated pressure of the valve approximates the force required to move the valve from open to closed position.

2. The construction specified in claim 1 characterized in that a spring is positioned between the valve and the piston.

3. In a through-conduit gate valve construction, a housing forming a valve chamber having aligned ports provided with opposed valve seats; gate mechanism having a solid portion to cover said ports in the closed position and a flow section provided with a conduit aligning with said ports in the open position mounted in said chamber for rectilinear movement between said seats to open and close the valve; a pair of stems having different diameters, one stem attached to the solid portion end of the gate mechanism and the second stem attached to the flow section end of the gate mechanism, a hydraulic piston operator attached to one of the stems, the ratio of the diameters of the stems being such that when the valve is operating at rated pressure, the pressure in valve body will move the gate to a predetermined position upon removal of external pressure on the operator.

4. The construction specified in claim 3 characterized in that the other stem is provided with disengageable manual operating means.

5. The construction specified in claim 4 characterized in that the disengageable manual operating means is provided with a split nut arrangement to lockingly engage or lockingly disengage the manual operating means.

6. The construction specified in claim 5 characterized in that the stem attached to the piston operator is of the larger diameter.

7. A through-conduit hydraulic operated gate valve comprising: a housing forming a valve chamber having aligned ports with opposed valve seats, a gate mechanism having a solid portion to cover said ports in the closed position and a flow section provided with a conduit aligning with said ports in the open position mounted in said chamber for rectilinear movement, a pair of stems of different diameters, the stem having the largest diameter attached to the flow section of the gate, the smaller stem attached to the solid section of the gate, a hydraulic piston attached to the larger stem, the ratio of the diameters of the stems being such that when the valve is operating at rated pressure, the pressure in the valve body will move the gate to the closed position upon removal of external pressure on the operator.

References Cited in the file of this patent

UNITED STATES PATENTS

| | | |
|---|---|---|
| 563,011 | Brown | June 30, 1896 |
| 630,067 | McIntosh | Aug. 1, 1899 |
| 798,551 | Willits | Aug. 29, 1905 |
| 966,672 | Ellison | Aug. 9, 1910 |
| 1,039,340 | Weitzel | Sept. 24, 1912 |
| 1,195,658 | Cockburn | Aug. 22, 1916 |
| 1,819,043 | Sleeper | Aug. 18, 1931 |
| 1,861,916 | Hennebohle | June 7, 1932 |
| 1,926,529 | Goldsborough | Sept. 12, 1933 |
| 2,161,175 | Laurent | June 6, 1939 |
| 2,541,968 | Laurent | Feb. 13, 1951 |
| 2,698,157 | Ludeman | Dec. 28, 1954 |

FOREIGN PATENTS

| | | |
|---|---|---|
| 532,732 | Canada | Nov. 6, 1956 |